United States Patent
Harman

(10) Patent No.: US 11,061,114 B2
(45) Date of Patent: Jul. 13, 2021

(54) RADAR SYSTEM FOR THE DETECTION OF DRONES

(71) Applicant: QINETIQ LIMITED, Hampshire (GB)

(72) Inventor: Stephen Anthony Harman, Malvern (GB)

(73) Assignee: QINETIQ LIMITED, Hampshire (GB)

( * ) Notice: Subject to any disclaimer, the term of this patent is extended or adjusted under 35 U.S.C. 154(b) by 283 days.

(21) Appl. No.: 16/306,773

(22) PCT Filed: Jun. 1, 2017

(86) PCT No.: PCT/EP2017/063363
§ 371 (c)(1),
(2) Date: Dec. 3, 2018

(87) PCT Pub. No.: WO2017/207714
PCT Pub. Date: Dec. 7, 2017

(65) Prior Publication Data
US 2019/0129006 A1    May 2, 2019

(30) Foreign Application Priority Data
Jun. 2, 2016  (GB) .................. 1609640

(51) Int. Cl.
*G01S 7/41* (2006.01)
*G01S 13/42* (2006.01)
(Continued)

(52) U.S. Cl.
CPC .............. *G01S 7/415* (2013.01); *G01S 7/352* (2013.01); *G01S 13/422* (2013.01);
(Continued)

(58) Field of Classification Search
CPC ........ G01S 7/415; G01S 7/352; G01S 13/422; G01S 13/424; G01S 13/426; G01S 13/52;
(Continued)

(56) References Cited

U.S. PATENT DOCUMENTS 4,389,647 A   6/1983  Fanuele et al.
5,173,706 A * 12/1992  Urkowitz ................ G01S 13/18
(Continued)

FOREIGN PATENT DOCUMENTS

WO    WO2016/030656 A1    3/2016

OTHER PUBLICATIONS

Harman, S., "A comparison of staring radars with scanning radars for UAV detection: Introducing the Alarm(TM) staring radar," 2015 European Radar Conference (EURAD), EUMA, Sep. 9, 2015, pp. 185-188, XP032824534.
(Continued)

*Primary Examiner* — Erin F Heard
*Assistant Examiner* — Michael W Justice
(74) *Attorney, Agent, or Firm* — Kenealy Vaidya LLP

(57) ABSTRACT

A radar system for the detection of drones, including a transmitter, a receiver and a processor, wherein the processor is arranged to process demodulated return signals in a first process using a Doppler frequency filter, and to store locations of any detections therefrom, and to process the demodulated signals in a second process to look for signal returns indicative of a preliminary target having a rotational element at a location, and should a detection be found in the second process, to then attempt to match a location of the preliminary target with returns from the first process, and to provide a confirmed detection if a location of a detection from the first process matches with the location of a detection from the second process. The disclosed subject matter enables improved detection rates for drones, by looking for outputs from both the first and second processes.

16 Claims, 3 Drawing Sheets

(51) Int. Cl.
*G01S 13/52* (2006.01)
*G01S 13/87* (2006.01)
*H01Q 21/20* (2006.01)
*G01S 13/56* (2006.01)
*G01S 7/35* (2006.01)

(52) U.S. Cl.
CPC .......... *G01S 13/424* (2013.01); *G01S 13/426* (2013.01); *G01S 13/52* (2013.01); *G01S 13/56* (2013.01); *G01S 13/878* (2013.01); *H01Q 21/205* (2013.01); *G01S 2007/356* (2013.01)

(58) Field of Classification Search
CPC ........ G01S 13/56; G01S 13/878; G01S 13/44; G01S 13/4436; G01S 13/4445; G01S 13/4454; G01S 13/4472; G01S 13/449; G01S 13/4481; G01S 13/9092; G01S 2007/356; H01Q 21/205
USPC .................................... 342/90, 80, 149, 427
See application file for complete search history.

(56) References Cited

U.S. PATENT DOCUMENTS

| | | |
|---|---|---|
| 5,995,062 A | 11/1999 | Denney et al. |
| 2011/0241928 A1* | 10/2011 | Oswald .............. G01S 13/524 |
| 2015/0323658 A1* | 11/2015 | Mithcell .............. G01S 13/02 |
| 2017/0285158 A1* | 10/2017 | Halbert .............. G01S 13/878 |

OTHER PUBLICATIONS

International Search Report and Written Opinion for PCT Patent App. No. PCT/EP2017/063363 (dated Sep. 14, 2017).

Collot, G., "Fixed/Rotary Wings Classification/Recognition," CIE International Conference on Radar (CICR-91), Beijing, China, Oct. 22-24, 1991, Proceedings Beijing International Academic Publishers 1991, pp. 610-612.

Search Report from GB Patent App. No. 1609640.6 (dated Mar. 14, 2017).

\* cited by examiner

RADAR SYSTEM FOR THE DETECTION OF DRONES

CROSS REFERENCE TO RELATED APPLICATION(S)

This application is a national phase filing under 35 C.F.R. § 371 of and claims priority to PCT Patent Application No. PCT/EP2017/063363, filed on Jun. 1, 2017, which claims the priority benefit under 35 U.S.C. § 119 of British Patent Application No. 1609640.6, filed on Jun. 2, 2016, the contents of each of which are hereby incorporated in their entireties by reference.

Some embodiments relate to radar systems, and more particularly to radar systems generally used to detect airborne objects.

Over the last few years the availability of model helicopters, remote piloted air systems (RPAS), Unmanned Aerial Vehicles (UAVs), multi-rotors and similar remote controlled aircraft of various types and sizes has increased dramatically, partially due to the decreasing cost of the technology that enables them to be flown without a great deal of skill and training. Such aircraft (herein otherwise referred to generally as drones) are often bought as toys, but they are often capable of carrying payloads such as cameras or other relatively light objects. This capability makes them useful for transporting objects into difficult to access locations, or carrying out monitoring or surveillance work.

It has not taken long for them to be used for socially undesirable or illegal tasks. A growing problem is the use of drones to deliver contraband into prisons, by flying the drone over a wall and landing it in an exercise yard or similar area. Other undesirable uses of drones include incursions into protected airspace, or invasion of privacy at sensitive areas.

A requirement has therefore arisen to be able to detect the use of drones. There has been developments in this area.

Acoustic sensors may be useful at very close range, but their utility deteriorates in noisy, urban environments. Video systems, including infra-red imaging systems, are useful for confirming a detected presence of a drone, but also suffer when in visually cluttered environments or in poor weather and darkness, and again often have difficulty detecting drones at longer ranges (such as more than several tens of metres), A wide angle lens provides good angular coverage but is unable to sense the drone at the longer ranges, whereas telephoto lenses provide good performance at long distances, but only with a very narrow field of view.

Radar systems can be used, but as the velocity of drones is so variable, and is often zero, they can easily get caught by the clutter filtration that radars often use to remove returns from static objects. Their velocities, and flight characteristics also often match birds, and so radars have been prone to high false alarm rates when used against drones.

Some embodiments therefore aim to provide a means for detection of drones that at least ameliorates some of the disadvantages of the related art.

To that aim, some embodiments provide a radar system for the detection of drones, having at least one receive antenna, the or each antenna being arranged to receive radiation from at least one region of interest; at least one transmit antenna, arranged to transmit into the at least one region of interest;
  transmitter circuitry arranged to generate a waveform for transmission, and to send a signal including the waveform to the or each transmit antenna;
  receive circuitry connected to the or each receive antenna and to a processor, wherein the receive circuitry is arranged to demodulate signal returns received by the receive antenna(s), and to provide the demodulated signals to a processor, characterised in that:
  the processor is arranged to process the demodulated signals in a first process using a Doppler frequency filter, and to store locations of any detections therefrom, and to process the demodulated signals in a second process to look for signal returns indicative of a preliminary target having a rotational element at a location, and should a detection be found in the second process, to then attempt to match a location of the preliminary target with returns from the first process, and to provide a confirmed detection if a location of a detection from the first process matches with the location of a detection from the second process.

Thus, some embodiments provide a radar system that is suitable for detecting drones having some sort of rotating feature whilst also being able to distinguish them from other objects such as birds, that may have similar flight paths and velocities as drones. The rotational element may be, for example, the rotor or rotors of a helicopter type drone, or could alternatively be one or more propellers on an aircraft, or any other rotating element on the drone, such as a motor or turbine.

The characteristics that the rotational elements produce on the radar signal returns may be Doppler frequency signals, or may be e.g. blade flashes from a helicopter blade etc. Other characteristics caused by a rotational element include body shadowing modulation caused by a prop covering a part of a body of a drone, or polarisation modulation caused by a prop periodically moving into and out of alignment with an illuminating polarised radar signal. Each of these are generally suitable for use in distinguishing a drone from birds and the like.

Advantageously, some embodiments may be adapted to produce a track of a confirmed detection based upon stored radar returns. Thus, detections obtained from the first process can be analysed to look for a track of the detected object. This may provide an indication of an approximate location of an operator of the drone, or otherwise may provide useful information, e.g. concerning the origin or intention of the drone operator.

Once a target has been confirmed, then advantageously the target may be tracked by examination of detections from the first process alone. Such first process detections typically include of reflections from the body of a drone, and these are generally stronger than the detections produced by the second process. Thus, tracking of these is easier. There will, of course, be many more detections from the first process (from birds, or other moving objects), but most of these are excluded from consideration as they will not pass the second processing step.

The stored detections from the first process may be used to provide a "back-track" of the confirmed target. The processor may advantageously be arranged, once the location of a confirmed target is found, to analyse the stored detection data to generate a track of the path of the body of the object prior to the initial detection. Thus, the movement of the drone may be back-tracked, e.g. to attempt to ascertain the origin or launch point of the drone.

Advantageously, some embodiments may have multiple transmit antennas and multiple receive antennas. An embodiment may include one or more panels, wherein each panel has at least one transmit antenna, and at least one receive antenna located thereon. Advantageously, each panel has a plurality of receive antennas, which are arranged to produce a plurality of receive beams. Conveniently, the receive beams may be configured as fixed, staring receive beams, that may be combined in the processor (or a separate beamformer) in a beamforming operation, to provide improved angular resolution of detected targets.

Each panel may further include front-end RF circuitry commensurate with a radar system. The transmit side may therefore include of an up-converter and a power amplifier, and the receive side may include of a low noise amplifier and down-conversion means. Some embodiments may employ an analogue beamformer, and/or a digitiser on the panel, Some embodiments may have digital beamforming done on the panel, whilst others may have such functionality employed centrally, for all panels. Some embodiments may have the beamforming function distributed across a plurality of different beamforming operations, which may be either all digital, all analogue, or a combination of the two.

To keep costs low each panel may advantageously be substantially identical, and may be arranged to connect to a central control unit including at least the processor, and may also include central waveform generation means, such as a signal generator, which is then distributed to the panels.

Each panel may be arranged to transmit and receive radiation into a defined sector.

Conveniently, each panel may be arranged to receive energy from a sector of approximately 60° wide, and approximately 45° high A plurality of panels may be appropriately arranged to cover regions of greater angular extent. Such an angular coverage for each panel allows around ten to be used to provide 360° coverage in azimuth and 180° in elevation. The panels may conveniently be arranged on or in an enclosure, that holds the panels at predetermined positions. The enclosure may house the processor, storage, and other elements such as a power supply.

Advantageously, some embodiments may have a processor that is arranged to control the panel to activate them in sequence, cycling through the region under observation one or more sectors at a time. Some embodiments may choose to operate a single panel at a time, so as to keep the data processing requirements to more modest levels to reduce cost. Others may choose to operate two or more panels simultaneously, e.g. to have an increased updated rate.

The nature of drones, and their usual flight patterns and velocities, is such that several (e.g. 3, 5, 10 or 15) separate panels, and hence sectors within the region of interest, can be cycled through whilst still maintaining a sufficient dwell time in each, and also maintaining a sufficient track on a target. A dwell time in each region of between 50 ms and 0.5 s can be provided, and alternatively, the dwell time can be between 70 ms and 0.2 s. Some embodiments may have a dwell time of approximately 0.1 s.

Some embodiments may have a variable dwell time in each sector. For example, the system may be arranged to change dwell times in those regions where a target has been confirmed, and/or where a preliminary target detection has occurred, prior to confirmation. Once a target confirmation has occurred, then it can be tracked from body returns (i.e. from detections of the first process) alone. As such returns are stronger, and easier to detect, a shorter dwell time may therefore be appropriate, allowing more time to be spent in other sectors.

Some embodiments may be arranged to generate and transmit a frequency modulated continuous wave (FMCW) signal. This allows continuous or near-continuous transmission of energy into a region, allowing the maximum transmitted power to be kept within reasonable limits, whilst allowing the system to measure target range. Techniques such as pulse compression may be used to improve range resolution.

In some embodiments, the FMCW signal is a linear sawtooth signal. The sawtooth signal may have a bandwidth chosen according to desired range resolution performance. Some embodiments may have a bandwidth of approximately 5 MHz, giving a range resolution of approximately 30 metres. Some embodiments may be arranged to vary their bandwidths, dependent upon factors such as the range of targets detected. For example, the range resolution may be improved (by increasing the bandwidth) when a target comes closer to the radar, and vice versa. Alternatively or as well, range resolution may be increased (by increasing the bandwidth), around a target of interest, once it has been detected, albeit that this may impact the range swath of the radar. Where bandwidth (and hence the number of range cells) is limited, then the sampled frequency band of the radar return may be adjusted to concentrate the range swath into desired range zone. This may be chosen according to e.g. known or expected target locations, or the position of known sensitive areas.

Advantageously, the or each receive antenna may be made from a plurality of elemental antennas working in co-operation. Each transmit antenna may be associated with the plurality of elemental receive antennas. This allows a plurality of receive beams to be formed within each sector covered by a transmit antenna. The transmit antenna and the plurality of elemental receive antennas may be conveniently located on a panel as discussed above. The elemental receive antennas may advantageously be arranged to allow their elemental beam patterns to be vectorially summed, so permitting the use of super-resolution techniques, such as monopulse or the like, to provide increased angular accuracy. Conveniently, this may be done with an analogue or digital beamformer, or some combination of the two. The plurality of elemental antennas can be arranged in an n by m array, where n and m are at least 2, and may be equal. Thus, super-resolution processing in both azimuth or elevation may be performed.

For those embodiments that employ an array of receive antenna elements, other forms of multiple beam processing may be employed, such as electronic switching of a receive beam direction, or otherwise scanning a receive beam. Conveniently, each panel may be arranged to provide multiple beams simultaneously, which may be processed e.g. as described above to provide additional gain and/or angular precision. Each panel may be arranged as a staring array, that is switched in and out in sequence.

Advantageously, some embodiments may have an interface for connection with other radars, to allow the system to synchronise with similar, connected radars to avoid unwanted interference therebetween. This may be achieved by, for example ensuring that the radar does not transmit into a region (and/or adjacent region) that is being illuminated by another radar, or at which another radar is sited, to avoid sending energy directly towards another radar, or towards a target being illuminated by another radar, which may cause noise or interference.

The interface may also or instead be used to provide a communications link between radar systems forming a network, and each radar in the network may be controlled so as to synchronise its switching with other radars in the network. Each radar may additionally be controlled to as to use different transmit frequencies or bands to others on the network, where interference may otherwise occur. One or more radars in a group may be arranged to adapt its or their operating frequencies, either by manual control from a human controller, or via automatic detection or prediction of interference based upon reception of interference, or prior knowledge (e.g. transmitted through the network) of the operating characteristics of neighbouring radars.

In some embodiments a separate controller may be used to control each radar, and determine a transmission timing arrangement to avoid the clashes mentioned above. The separate controller may also control the frequency channels or bands of each radar system in the network. Alternatively, one of the radars in the network may function as a control radar that performs these functions.

Advantageously, some embodiments may have an interface (which may be the same, or different interface to that mentioned above) to allow integration with a computer that provides a user interface. The computer may also allow integration with other sensors, such as audio or video sensors.

Advantageously, some embodiments may have an interface (which may be the same, or a different interface to those mentioned above) allowing connection to a separate system that may be used to further identify the target, such as an electro-optic system, or to a system used to counter the target in some manner. The electro-optic system may include of e.g. a camera. The system for countering the target in some manner may include of any suitable drone countermeasure, such as an electromagnetic or sonic jammer, or a system that directs a projectile or net at the target, or any other suitable system. It may also include means to notify a human operator of the presence of the target, to the target's current position, the targets likely origin position (by examining its positional history), and/or the target's current speed, height and/or direction. It may also guide the operator to the current position or origin.

Advantageously, some embodiments may have an interface (which may be the same, or a different interface to those mentioned above) that allows a connection between radars that facilitates cooperation regarding the monitoring of particular regions of interest. For example, a first radar that is sited close to a large building may be arranged to have a shorter range, to exclude the processing of returns from the building, whereas a second radar may be arranged to monitor beyond the building in regions not covered by the first radar.

It will be appreciated by those of ordinary skill in the art, that signals received from targets within a region or sector will have a Doppler frequency component that is based upon the target's radial velocity. Other indications of the velocity of a target may be determined, e.g. by measuring the time taken to move between successive points of a track.

Some embodiments may have a filter that processes received signals to remove any detections from objects moving faster than a predetermined speed. This maybe chosen, for example, based upon the maximum speed of a target of interest.

Some embodiments process returns from the receiver to search for evidence of a target having a rotor, propeller, or other rotational element. This may be done by examination of the Doppler frequency profile of the returns, and looking for characteristic modulation generated by any rotating element used to provide propulsion or lift to the drone. This may be, for example, a propeller, rotor, or motor used to drive either of these. The Doppler frequency signature of such rotating objects is characterised, for example in G Collot "Fixed/Rotary Wings Classification/Recognition", Proceedings CIE International conference on Radar 1991. Some embodiments may also process returns to look for "blade flashes", or other characteristic of any rotational element on the target, which tend to give a recognisable modulation to radar returns in the time domain, These are indicative of the target being a drone, if they occur at a rate typical of the rotational elements used on such devices, which typically rotate significantly faster than, say, the wheels of a car or bicycle.

Some embodiments are arranged, once a preliminary detection has occurred, through detection of a rotating feature, to examine the stored returns to identify returns from a main body of a target These returns will typically be detectable towards or at the outer range limits of the radar—at greater range than that of the rotating objects, as the body of the target will generally have a radar cross section (RCS) that is large compared to that of any rotating elements on the target.

Some embodiments conveniently use Doppler frequency processing to attempt to separate potential targets from static background clutter. Should the drone be hovering, or moving very slowly, then any returns from the body of the drone may be filtered out, due to their very low, or zero Doppler frequency, leading to a loss of detection of the body. Clearly then, during the time period a target hovers body detections may be lost, and a succession (in time) of detections at that location will be missing from the stored set of returns. Some embodiments may therefore be arranged, when producing a track of a confirmed target, to look back through sometimes many seconds or even minutes-worth of the stored detections for a detection at or about the present location of the target.

Extrapolation or interpolation techniques may also be used on tracks, to fill in gaps or to extend a track out to e.g. ascertain likely launch points or destinations.

The signature may be analysed to detect the speed of rotation of the rotating feature, and to exclude from detection any results from targets having rotational speeds below predetermined limits. If such a feature is detected that passes this filter, then it is assumed that the target is a drone (as compared to a bird, bicycle or car), and an alert may be flagged to an operator, or to another system, as described above. Super-resolution techniques may also be used to filter out false alarms such as cars, by providing angle discrimination, as appropriate, in a particular environment.

Returns from targets such as fans, that may be present e.g. in air-conditioning units on buildings may be easily filtered or disregarded due to their unchanging position. Such target may be filtered out during a set-up or calibration phase carried out at switch-on, commissioning or at appropriate intervals. Seasonal or diurnal variations in the use of e.g. fans etc. may also be considered, which may influence the chosen calibration interval.

When an alert is provided, the alert may include, in some embodiments, a simple indication of the presence of a drone. Other embodiments may have varying degrees of information provided, such as one or more of the estimated current location of the drone, its current speed and direction, a track showing locations or paths found during the preliminary detection phase, an estimated launch or origin point, and an estimated future path, based upon the current known path.

Some embodiments may also be arranged to compare Doppler frequency returns from the rotating elements with a database of measured returns from specific known models of drone, and so provide an indication of the manufacturer and model of the drone. This may be useful for assessment of the potential risk posed by the particular model, and also what vulnerabilities the particular model may have, for mitigating against or attacking the drone in some way. For example, it may be known that certain models of drone have particular weaknesses or vulnerabilities.

Some embodiments may be arranged to hand over information relating to preliminary or confirmed detections to other radars or sensors via the network connection discussed above. This may guide or direct other radars or other sensors (such as acoustic or optical) or countermeasures towards the location of the detected target, to provide further information relating to the target. Some embodiments may further include one or more such sensors or countermeasures. Some embodiments may be arranged to do this in a totally automated manner, whilst others may have a degree of manual (human) control in the decision-making process regarding activation of alternative sensors or countermeasures following a detection.

The countermeasure employed may include electromagnetic, optical or acoustic jammers, or physical take-down means, such as nets, or projectiles, or attacking the drone with another drone. It may also include a person being tasked with seeking an operator of the drone e.g. by vehicle.

Some embodiments provide a method of processing radar returns for the detection of drones, including:
 i) receiving a plurality of radar returns from a region of interest;
 ii) processing the returns in a first process using a Doppler frequency filter to locate moving objects commensurate with the body of a drone;
 iii) storing information pertaining to the time and location of the detections in a computer memory;
 iv) processing the returns in a second process to identify characteristics indicative of a rotating object on a drone, and identifying a location (range and direction) to a target from such a return;
 v) upon identifying said characteristic in step iv), matching the location from the second process with a location from the first process, and if a match is found, declaring a target detection at the location.

The characteristic indicative of a rotating object may be a Doppler frequency characteristic, or may be a time-domain based characteristic such as a blade-flash signal, or may be another characteristic, such as is described herein.

The method may include the additional step of, when a detection has been declared, analysing previously stored return data to identify body returns corresponding to the target, and forming a track of the body position from the identified returns.

Some embodiments of the invention may further include a method of operating a plurality of radar systems, each of a type according to any of the embodiments described above, wherein the relative positions of each radar are ascertained, and the radars are synchronised together so that switching between different transmitters on a given radar is controlled so that the given radar is arranged not to transmit a signal from its transmitter into a region illuminated by another radar, or where another radar is sited, when the other radar is either transmitting or receiving in the direction of the given radar.

Some embodiments include a radar system for the detection of drones, having at least one receive antenna, the or each antenna being arranged to receive radiation from a region of interest; at least one transmit antenna, arranged to transmit into the region of interest;
 transmitter circuitry arranged to generate a waveform for transmission, and to send a signal including the waveform to the or each transmit antenna;
 receive circuitry connected to the or each receive antenna and to a processor, wherein the receive circuitry is arranged to demodulate signal returns received by the receive antenna(s), and to provide the demodulated signals to a processor, characterised in that:
  the processor is arranged to process the demodulated signals in a process to look for signal returns indicative of a target having a rotational element at a location within the region of interest, Advantageously, each transmit antenna of the radar system is associated with a plurality of receive antennas, such that a plurality of receive beams may be formed within a region.

Advantageously, the radar may include of a plurality of panels, each panel having a transmit antenna and a plurality of receive antennas mounted thereon, and wherein each panel is arranged to stare at a predetermined sector of the region of interest.

Advantageously, the system may be arranged to activate each panel, or a group of panels, in turn, and to provide dwell time in a given sector or sectors of between 50 ms and 0.5 s, and alternatively between 70 ms and 0.2 s when no target has been confirmed in a given sector.

Any part of one embodiment of the presently disclosed subject matter may be combined, where appropriate, with any other parts of other embodiments.

Specific embodiments of the invention will now be described, by way of example only, with reference to the following Figures, of which:

FIG. 1 diagrammatically illustrates a) a simplified block diagram of a first embodiment of the invention, and b) an enclosure showing the antenna arrangement;

Figure 1:
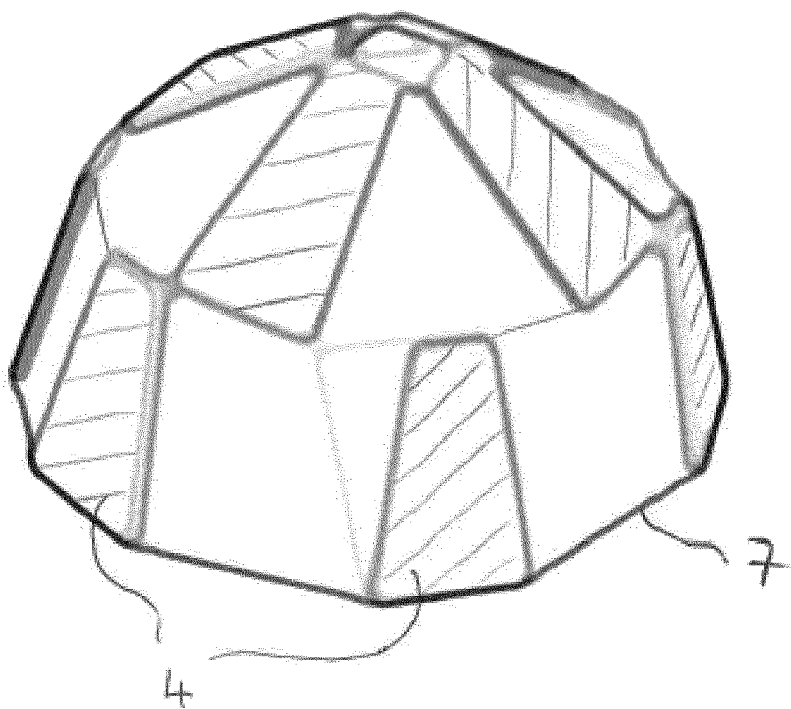
Figure 1:
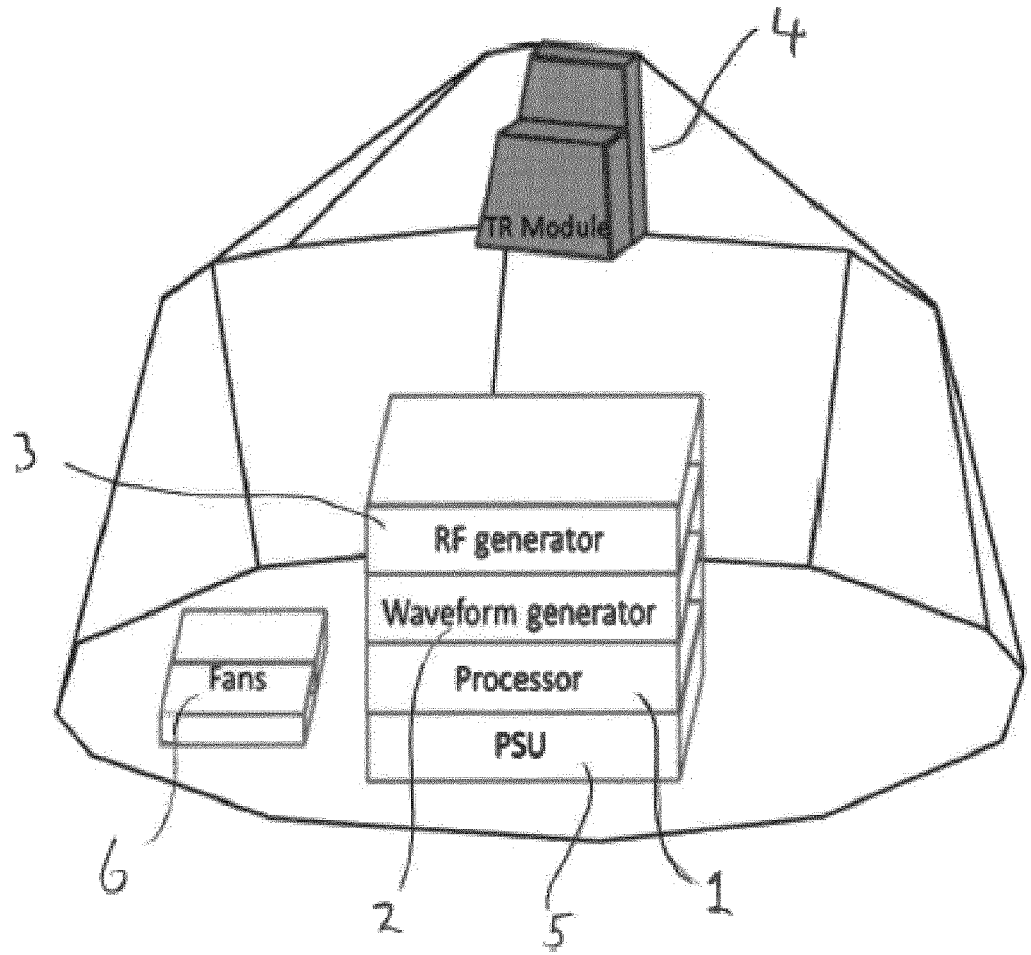

With reference to FIG. 1a, an embodiment of the invention shows at a), a block diagram indicating the main components making up the radar system. The functional elements that make up the radar include a processor 1, a waveform generator 2, and RF generator 3, a plurality of transmit/receive (T/R) modules 4 (only one shown), generally referred to as panels, and ancillary equipment including power supply 5 and cooling 6. The RF generator 3 is connected to the T/R modules 4, and supplies the T/R modules with a modulated RF signal. Each T/R module 4 has amplification means, such as an RF amplifier, and an antenna, which is described in more detail below.

Each T/R module further includes a receive antenna having a plurality of elemental sub-antennas, each connected to a low noise amplifier, and from there to a mixer. The mixer takes an input from the transmitted signal to produce at its output a downconverted signal suitable for digitisation and subsequent processing. The T/R modules, and the other components discussed above all sit within an enclosure 7 that is shown more clearly in FIG. 1b.

A digitiser on the T/R module converts the downconverted signal to a digital signal, and passes the digitised signal on to the processor 1, where the digitised data is combined in a digital beamformer and subsequently processed as described below.

Note that the processor 1 may include a processing function that is implemented in a single processor, or may be distributed across a plurality of different physical devices. The processor may be a general purpose processor, although a dedicated digital signal processor can form at least a part of the processor function. A suitably programmed FPGA or ASIC or the like may also be used in other embodiments, particularly in embodiments where more than one panel at a time may be active.

Figure 2:
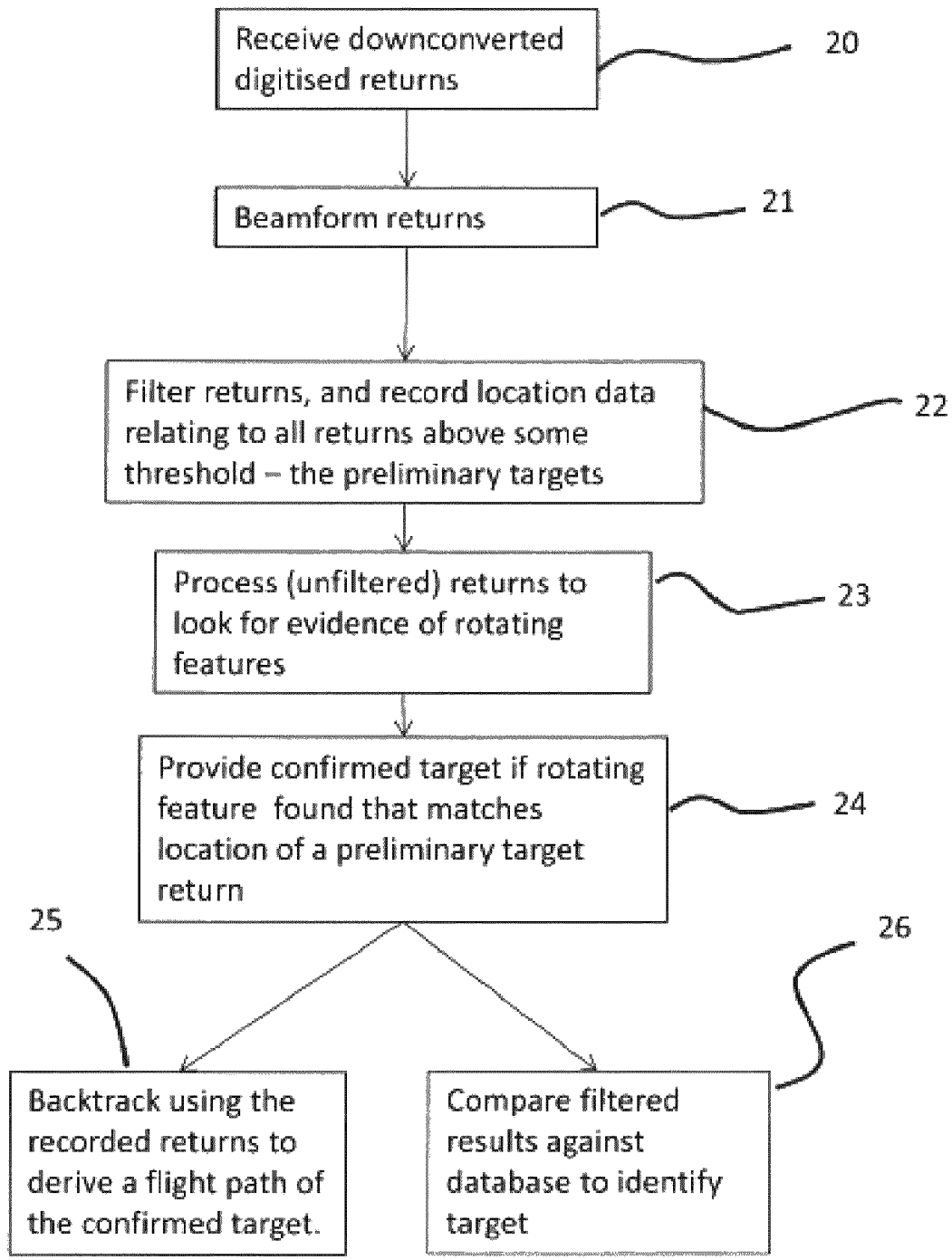
FIG. 2 shows in block diagrammatic form the steps carried out by the processor in detecting a target.

FIG. 2 shows, at a simplified, high level, the steps carried out by the processor. At step 20, the processor 1 receives downconverted and digitised returns from each T/R module in turn. For data relating to each T/R module, the implements a beamforming process at step 21, which may include monopulse processing to provide improved angular resolution. The beamformed data is filtered at step 22, using a first Doppler filter to remove signals that are moving either too slowly or too quickly as compared to velocities of targets of interest, and analyses said filtered data to search for signals that are greater, by a predetermined margin, than the underlying noise. Constant False Alarm Rate (CFAR) processing is used, that effectively provides a threshold that adapts to the underlying noise levels present in the returns.

If such a signal is received then it is deemed a preliminary target. Its position over subsequent detections is recorded. The full, unfiltered (by the first Doppler filter), digitised returns from all preliminary targets are analysed in a second filtering process at step 23, where the second filter is arranged to pass signals that have characteristics suggestive of a rotational object, such as a propeller, rotor, or rotating element such as a motor or turbine component. This may be a Doppler filter, or may be a filter arranged to look for evidence of rotating features in a time-domain signal, such as blade flash. The locations of any signal which passes this detection process are recorded, and if they match locations from the first process, then a confirmed target detection is then flagged up, at step 24. Optional further processing of the confirmed detection may be carried out, e.g. a) to estimate a likely origin based upon its track (as in step 25), b) to estimate one or more likely destination points, or c) to compare its Doppler (or time domain) profile with a database of such profiles to provide a potential manufacturer and model details of the detected object (as in step 26). The output of the second filter is likely to be more informative in this latter embodiment, although the output of the first may be use as well, or instead of, the second.

Looking again at FIG. 1b, an enclosure 7 is shown with a plurality of T/R modules e.g. 4 mounted thereon. Each T/R module is substantially similar to the others, which has benefits in keeping production costs down, and also as regards system expandability. The particular arrangement shown provides 360° coverage in azimuth, and approximately 180° in elevation. Of course, other arrangements are possible, that may have differing degrees of coverage. For example, another embodiment includes what is essentially half of that shown in FIG. 1b, to provide approximately 180° in both azimuth and elevation.

The above system uses homodyne processing, but other embodiments may employ more sophisticated processing, such as heterodyne processing which has the advantage that the range swath of the radar may be adjusted, but at additional cost and complexity. E.g. for systems using a sawtooth chirped waveform, heterodyne processing may be done by mixing the returned waveform with a copy of the transmitted signal, with an appropriate delay being applied to the copy, so as to bring returns from a chosen range within a chosen IF band of the radar. The degree of delay applied to the copy determines a given range spread that will fall within the IF band of interest, and it will be seen that applying a longer delay to the copy will tend to bring returns from a longer range within the IF band of interest. Such a technique is known as stretch processing.

Figure 3:
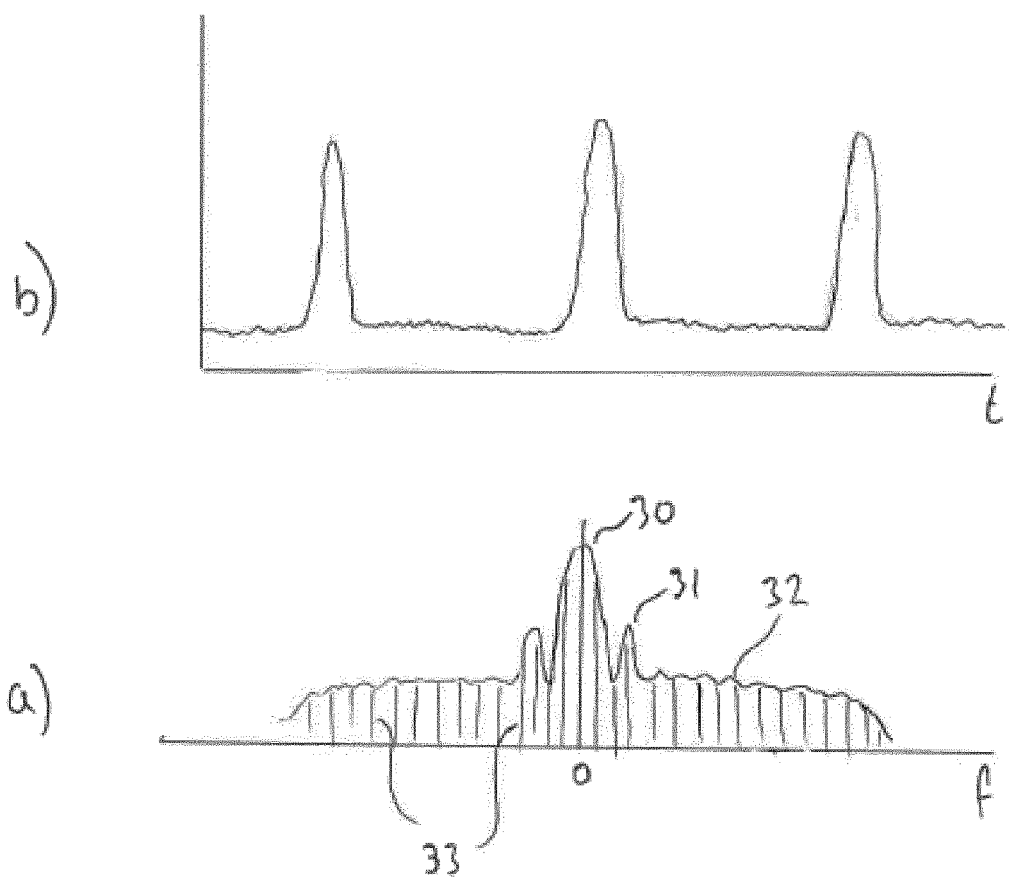
FIG. 3 shows example signals as may be recovered from radar returns for the detection of rotating components.

FIG. 3 shows in general terms examples of the kind of returns that may be received from rotating elements on a drone, such as the prop or motor components.

FIG. 3a shows a Doppler profile of a single drone motor with a blade attached thereto. Doppler frequency (double sided) is shown on the x-axis and arbitrary received power shown on the y-axis. A large DC component 30 comes from the stationary body of the drone. A large peak 31 also appears at low frequencies from the motor component. It will be understood that these are at a low frequency due to their location near the centre of rotation, and hence their relatively low radial velocity.

Further out from the DC point, the returns are due to different parts of the blade, with the tips of the blade having the highest radial velocity and hence producing the highest frequency components.

The trace 32 shows the general envelope of the Doppler profile, but in reality it will be understood that the returns will include a series of harmonically related frequency spikes, typically as indicated at 33.

FIG. 3b shows a time domain representation typical of that often seen from a helicopter type rotor. The x-axis is time and the y-axis again is arbitrary received power. The representation includes of a regular series of sharp peaks. Each peak occurs when the blade of a helicopter or drone rotates so as to have its axis perpendicular to the direction of view—i.e. it is being seen face-on. At that point, a comparatively large signal is reflected back, causing the peak shown.

The signals as shown in FIGS. 3a and 3b are distinctive, and so can be detected by appropriate signal processing software running on processor 1, as is known to the normally skilled person.

Figure 4:
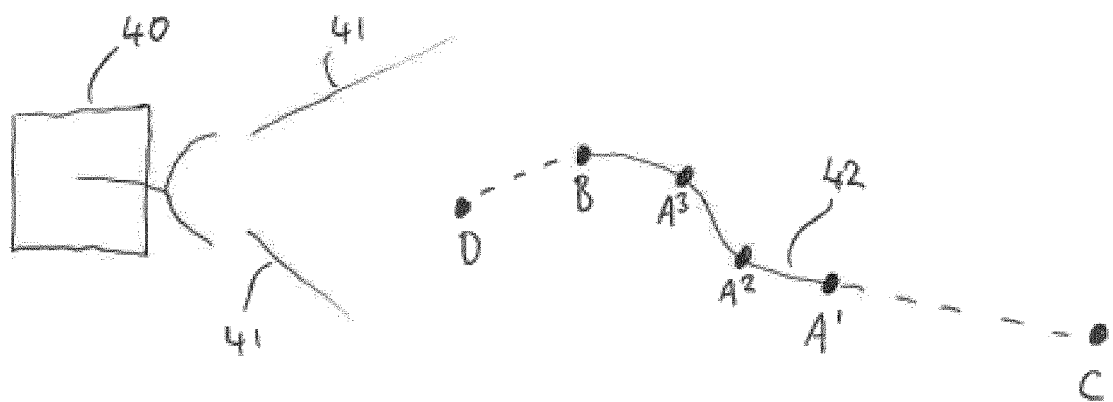
FIG. 4 shows a representation of an information chain of a detected target in an embodiment of the presently disclosed subject matter.

FIG. 4 shows an example of an information chain that may be gathered by an embodiment of the presently disclosed subject matter. The figure shows in plan view a radar 40, such as that described in relation to FIGS. 1 and 2 that is arranged to view a region generally within the lines shown at 41. A target (indicated by black dots), along with its track 42 (not to any uniform scale) is shown at various detection points as described below.

A preliminary detection of a target is made at point A', from returns from the main body of a (preliminary) target object, e.g. from the first detection process. The preliminary target provides further returns e.g. $A^2$ and $A^3$ that can, in subsequent processing, be used to produce a track of the target. At point B, the target is close enough for the returns to contain detectable characteristics from rotating components (e.g. the blades or motors) on the target, and hence a target is confirmed. At that point, the returns $A^2$ and $A^3$ are associated with the target B, and the track of the target is produced. The track may be extrapolated back in time to produce a best guess launch point C, or direction of arrival, to aid detection of an operator of the target. Alternatively, the raw returns may be re-processed, using a lower detection threshold, to attempt to produce a longer range track of the object from its body returns.

The track may be extrapolated forward in time to produce a best guess at a likely destination D of the target. Assumptions based upon likely targets (e.g., the location of a prison exercise yard) may be used to assist this best guess. The extrapolation forward in time may be used to advise or initialise any countermeasures, such as those described above.

The invention claimed is:

1. A radar system for the detection of drones, the radar system comprising:

at least one receive antenna, each antenna being arranged to receive radiation from at least one region of interest;

at least one transmit antenna, arranged to transmit into the at least one region of interest;

transmitter circuitry arranged to generate a waveform for transmission, and to send a signal including the waveform to the or each transmit antenna;

receive circuitry connected to the or each receive antenna and to a processor, wherein the receive circuitry is arranged to demodulate signal returns received by the receive antenna(s), and to provide the demodulated signals to the processor, characterized in that:

the processor is arranged to process the demodulated signals in a first process using a Doppler frequency filter to remove signals that are moving either too slowly or too quickly compared to drone velocities, and to store locations of any detections therefrom, and to process the unfiltered demodulated signals in a second process to look for signal returns indicative of a preliminary target having a rotational element at a location, and should a detection be found in the second process, to then attempt to match a location of the preliminary target with returns from the first process, and to provide a confirmed detection if a location of a detection from the first process matches with the location of a detection from the second process.

2. The radar system as claimed in claim 1 wherein the processor is adapted to produce a track of a confirmed detection target based upon prior detections from the first process.

3. The radar system as claimed in claim 1 wherein the processor is arranged to control each transmitter so that the signal provided for transmission is transmitted sequentially by each of one, or a group including more than one, of the plurality of transmitters in turn.

4. The radar system as claimed in claim 1 wherein the transmitter circuitry is configured to produce a frequency modulated continuous wave (FMCW) signal for transmission.

5. The radar system as claimed in claim 4 wherein the FMCW signal is a linear sawtooth signal.

6. The radar system as claimed in claim 1 wherein each transmit antenna is associated with a plurality of receive antennas, such that a plurality of receive beams may be formed within a region.

7. The radar system as claimed in claim 6 wherein the radar includes a plurality of panels, each panel having a transmit antenna and a plurality of receive antennas mounted thereon, and wherein each panel is arranged to stare at a predetermined sector of the region of interest.

8. The radar system as claimed in claim 7 wherein the system is arranged to activate each panel, or a group of panels, in turn, and to provide dwell time in a given sector or sectors of between 50 ms and 0.5 s when no target has been confirmed in a given sector.

9. The radar system as claimed in claim 6 wherein the processor is arranged to process at least two of the plurality of receive beams using a monopulse technique to provide at least one of azimuth and elevation information.

10. The radar system as claimed in claim 1 wherein the radar has an interface for connection with other radars, to allow the system to synchronize with connected radars to avoid unwanted interference therebetween.

11. The radar as claimed in claim 10 wherein the radar is arranged to synchronize with surrounding radars by means of at least one of time multiplexing, frequency multiplexing or spatially multiplexing its transmissions.

12. The radar system as claimed in claim 1 wherein the system has a filter to remove targets that are moving faster than that expected of a drone of interest.

13. A method of processing radar returns for the detection of drones, comprising:
    i) receiving a plurality of radar returns from a region of interest;
    ii) processing the returns in a first process using a Doppler frequency filter to locate moving objects commensurate with drone velocities;
    iii) storing information pertaining to the time and location of the detections in a computer memory;
    iv) processing the unfiltered returns in a second process to identify characteristics indicative of a rotating object on a drone, and identifying a location (range and direction) to a target from such a return;
    v) upon identifying the characteristic in step iv), matching the location from the second process with a location from the first process, and if a match is found, declaring a target detection at the location.

14. The method as claimed in claim 13 wherein, in step (v), the matching of location data includes looking at both current and previous location data from the first process.

15. The method as claimed in claim 13 including:
    vi) from the location of the declared target, back-tracking through the information stored at step (iii) to produce a prior track of the target.

16. The method as claimed in claim 13 further comprising: arranging groups of one or more receiving elements together to form a plurality of staring arrays, arranging the arrays to receive energy from different sectors within the region of interest, and switching between the arrays to cover the full region of interest.

* * * * *